(12) United States Patent
Domer (10) Patent No.: US 6,279,855 B1
(45) Date of Patent: Aug. 28, 2001

(54) AIRCRAFT TERMINAL/HANGAR FACILITY

(75) Inventor: Christian Domer, Rifton, NY (US)

(73) Assignee: Rifton Enterprises, Inc., Rifton, NY (US)

( * ) Notice: Subject to any disclaimer, the term of this patent is extended or adjusted under 35 U.S.C. 154(b) by 0 days.

(21) Appl. No.: 09/165,842

(22) Filed: Oct. 2, 1998

(51) Int. Cl.⁷ .................................................. B64F 1/12
(52) U.S. Cl. ........................ 244/114 R; D25/3; 52/174; 52/175
(58) Field of Search ..................... 244/114 R; D25/3; 52/174, 175, 176, 169.3

(56) References Cited

U.S. PATENT DOCUMENTS

| D. 208,766 | 10/1967 | Solomon ................................ D25/3 |
| D. 223,749 | 6/1972 | Jones ..................................... D25/3 |
| D. 241,648 | 9/1976 | Magill .................................... 52/30 |
| 1,780,102 | 10/1930 | Watt ...................................... 52/200 |
| 3,033,499 | * 5/1962 | Ash ..................................... 244/144 R |
| 3,556,441 | 1/1971 | Oberlander ...................... 244/114 R |
| 3,558,085 | * 1/1971 | Magill .............................. 244/114 R |
| 3,571,990 | * 3/1971 | Rossman ......................... 244/144 R |
| 3,572,619 | 3/1971 | Brown ............................. 244/114 R |
| 3,842,553 | 10/1974 | Billgren et al. ....................... 52/175 |
| 3,916,588 | 11/1975 | Magill .................................... D25/3 |
| 3,981,464 | * 9/1976 | Dudley ............................ 244/114 R |
| 4,218,034 | 8/1980 | Magill ............................. 244/114 R |
| 5,368,257 | 11/1994 | Novinger ........................ 244/114 R |

OTHER PUBLICATIONS

Illustration published in Science and Invention Magazine, entitled "Air Transportation Station of 1950", Jan. 1926.*
Illustration published in Popular Science Magazine, pp. 96 and 97, Jul., 1948.*
Article published in Popular Science Magazine, entitled "What It's Like To Fly A Car", by Wilbur Shaw and Devon Francis, Jul. 1952.*

* cited by examiner

Primary Examiner—Charles T. Jordan
Assistant Examiner—Judith A. Nelson
(74) Attorney, Agent, or Firm—Cooper & Dunham LLP (57) ABSTRACT

An aircraft terminal/hangar facility having the passenger areas and maintenance/hangar areas located in the same building such that the two area are separate but adjoining and transverse with respect to each other.

13 Claims, 7 Drawing Sheets

FIG. 1

LOWER LEVEL

FIG. 2

UPPER LEVEL

AIRCRAFT TERMINAL/HANGAR FACILITY

FIELD OF THE INVENTION

This invention relates generally to the field of airport terminals and support buildings, and in particular, to a single airport building which provides facilities for both passengers and aircraft in separate, but adjoining portions.

BACKGROUND OF THE INVENTION

In a conventional airport terminal building, the passengers arrive using ground transportation at a street-side entrance and the aircraft are brought to the terminal on the runway side. The aircraft pull up to passenger gates where some servicing of the aircraft takes place, such as refueling, loading and unloading cargo, and minor maintenance. However, a conventional airport terminal typically does not provide for major maintenance of the aircraft or indoor storage of the aircraft. Instead, a separate building, or hangar, is located away from the terminal building.

Smaller airline or general aviation facilities often lack the resources for providing two separate buildings. Also, two separate buildings require that each building be separately staffed thereby duplicating some staff positions, for example, the number of security guards. Accordingly, such facilities often do not provide any separation of passengers from the aircraft servicing equipment and personnel. For example, in such facilities, the passengers often must walk through the hangar or around the hangar to waiting aircraft, which substantially degrades the passenger experience.

Although U.S. Pat. No. 3,556,441 relates to a multilevel airport building structure which includes hangar areas and a concourses the aircraft are kept separated from the passengers by moving the aircraft on elevators between the hangar areas and the boarding areas. Aircraft elevators are impractical for general aviation facilities.

Equipment for servicing and supporting aircraft is usually placed along the walls of a hangar to allow a large space for storing and rearranging aircraft. Typically, each hangar has its own hangar support service area and corresponding equipment which results in duplication of such areas and equipment.

Although U.S. Pat. No. 1,780,102 relates to an aeroplane hangar with multiple stalls connecting to a central space, the hangar is a stand-alone single level structure which requires that the fuselage of the aircraft be moved into the central space for major repairs.

SUMMARY OF THE INVENTION

An object of the invention is to overcome the disadvantages of conventional airport buildings.

Another object of the invention is to provide an airport building which has a passenger area; and an aircraft maintenance and storage area adjoining, and transverse, to the passenger area. This airport building can also provide a passenger area defining an axis; and an aircraft maintenance and storage area having at least two hangars, one hanger offset from the other hangar along the axis. Also, the passenger area of this building can have: (a) a passenger entry area; (b) a passenger boarding area; and (c) a passageway connecting the passenger area to the passenger boarding area in which passenger services and amenities are provided. In addition, the aircraft maintenance and storage area can have at least one hangar; and a hangar support area. Also, the passageway can be vertically separated from the aircraft storage and maintenance area. Further, the office area can extend along one or more portions of the airport building and can be located on the runway side or the street side of the airport building. Also, the airport building can be positioned such that the passenger area extends from a street side of the building to a runway side of the building, and the aircraft storage area has at least one portal adjacent to an apron, the apron having access to taxiways.

A further object of the invention is to provide an airport building having: (a) at least two hangar areas, each hanger area having a portal on one side of the hangar area, each portal providing access for aircraft from a respective apron outside the airport building into the respective hangar area; (b) a hangar support area located between the respective hangar areas, the hangar support area providing servicing equipment for servicing aircraft in each of the respective hangar areas; (c) a first pedestrian area located adjacent each respective hangar area on a first side of the hangar storage area, the first pedestrian area having a pedestrian portal for providing access for pedestrians to the first pedestrian area from outside the airport building; (d) a passageway connected at a first end to the first pedestrian area; the passageway providing a bypass of the hangar support area for pedestrians; (e) a second pedestrian area located adjacent each respective hangar area on a second side of the hangar support area; the second pedestrian area connected to a second end of the passageway and adjacent a first apron on one side of the airport building; such that each respective hangar area apron is located adjacent to the first apron in the direction of the central axis of the first pedestrian area.

These objects and other objects, advantages, and features of the invention will become apparent to those of skill in the art upon the following description of the features of the invention.

DETAILED DESCRIPTION OF THE INVENTION

In the description below, like reference numerals are used to describe the same, similar, or corresponding parts in the several views of the figures.

FIGS. 1–4 illustrate an embodiment of the invention. As shown in FIGS. 1–4, the aircraft terminal/hangar facility 100 of the present invention has three distinct operational areas, a passenger area 110, a hangar and maintenance area 120, and one or more office areas 130. The passenger area 110 has a passenger entry area or lobby 140 where passengers enter from the street or land side 145 of the airport, a passenger boarding area or lounge 150 for enplaning and deplaning on the runway or air side 155 of the facility, and a passageway or concourse 160 connecting the passenger entry area to the passenger boarding area.

The hangar and maintenance area 120 provides one or more aircraft storage areas or hangars 170 and a hangar support area 180. The relative arrangement of the passenger area 110 and the hangar and maintenance area 120 provides for physical separation of these two areas such that the two areas adjoin, but the interior of the areas are physically separated.

Figure 1:
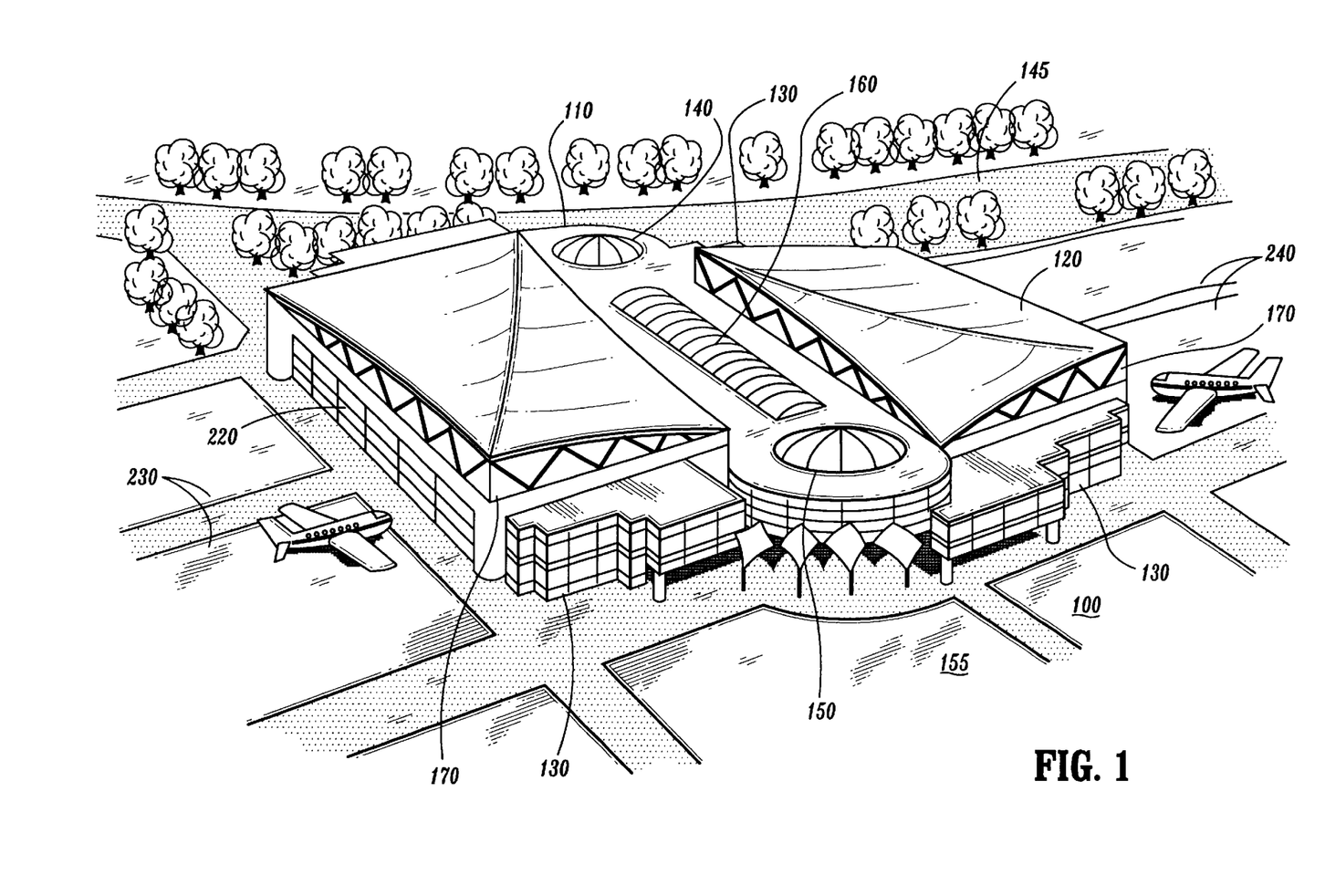
FIG. 1 illustrates a perspective view of a terminal/hangar facility according to one embodiment of the present invention.
Figure 2:
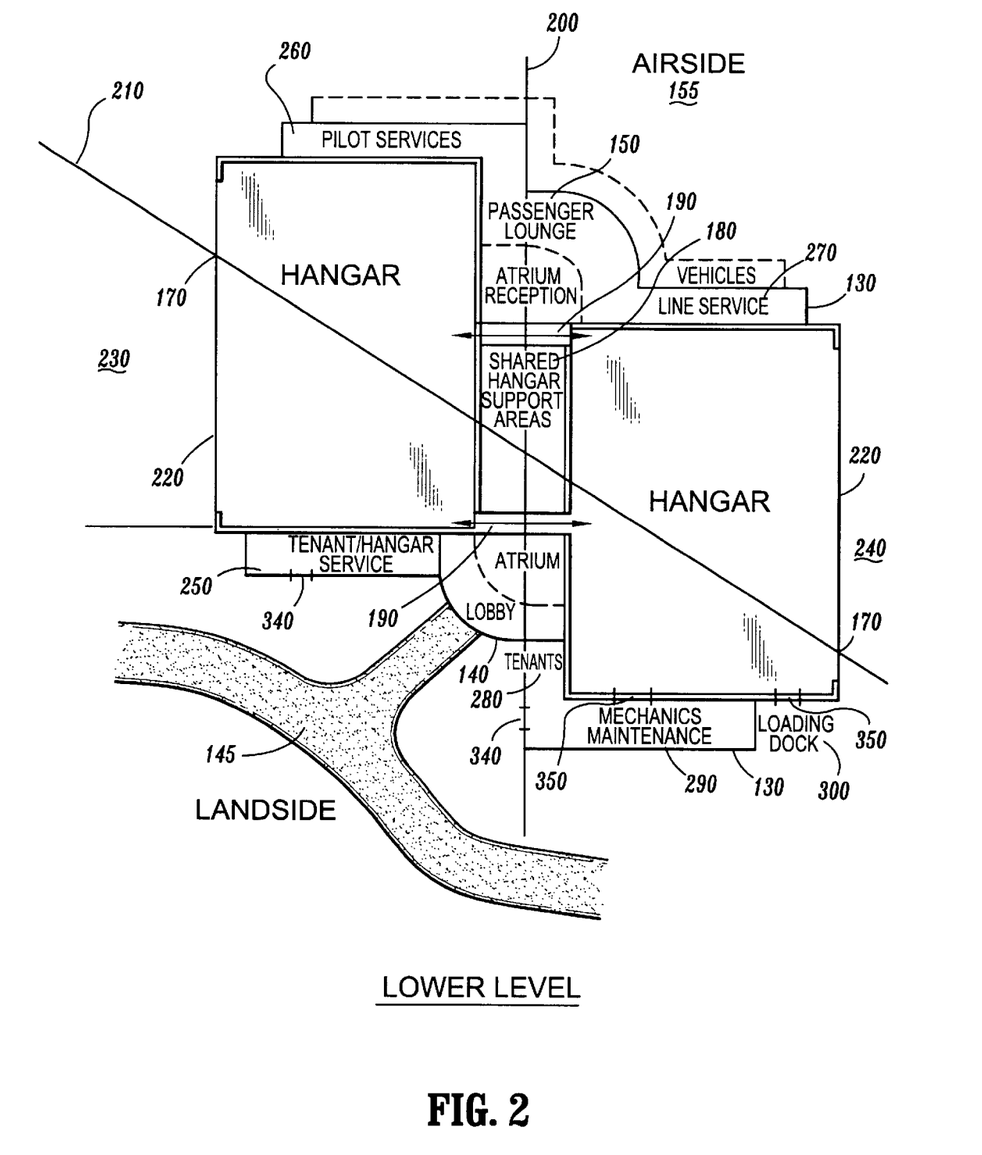
FIG. 2 illustrates a top view of the first level of an aircraft terminal/hangar facility according to one embodiment of the present invention.
Figure 3:
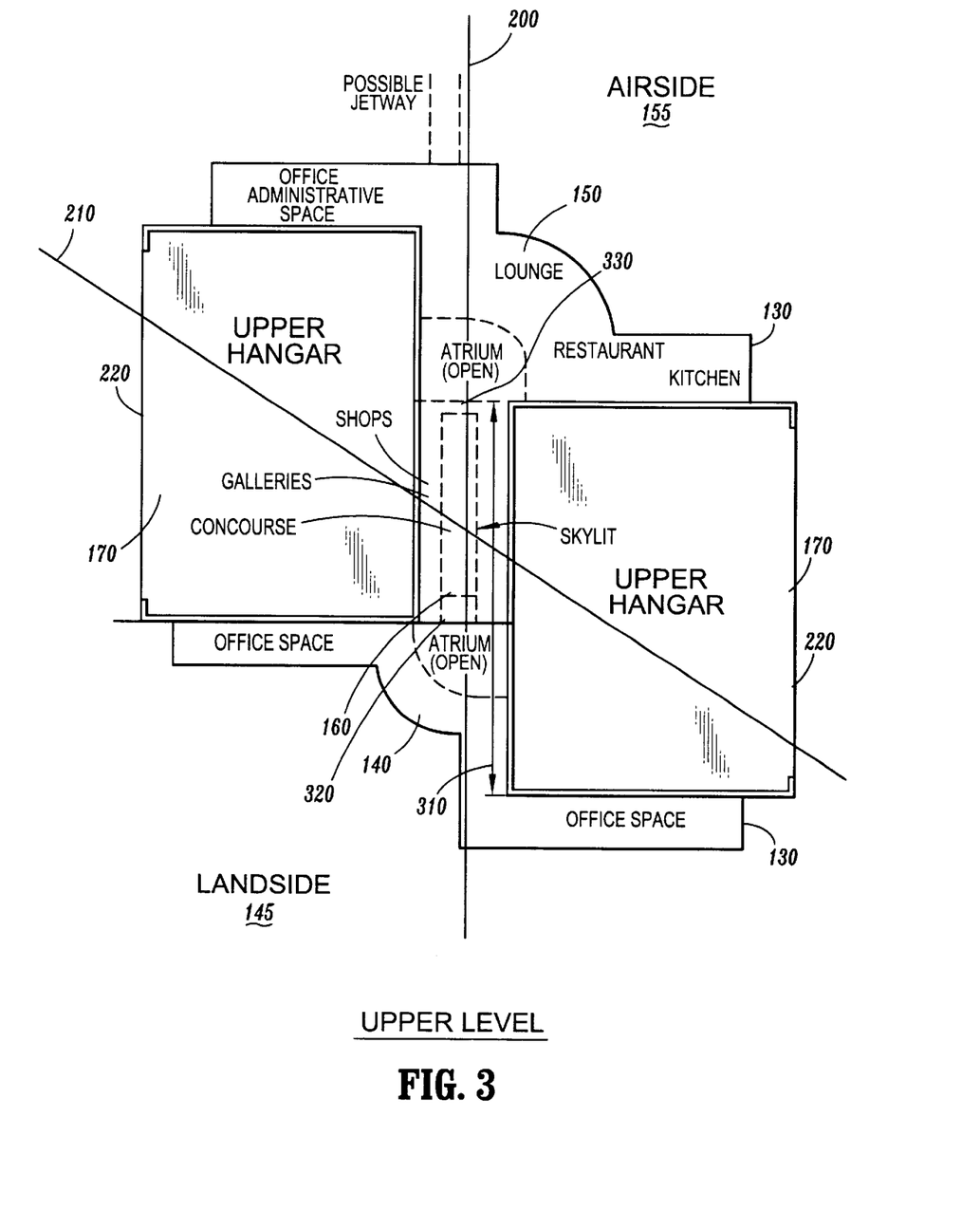
FIG. 3 illustrates a top view of the second level of an aircraft terminal/hangar facility according to one embodiment of the present invention.
Figure 4:
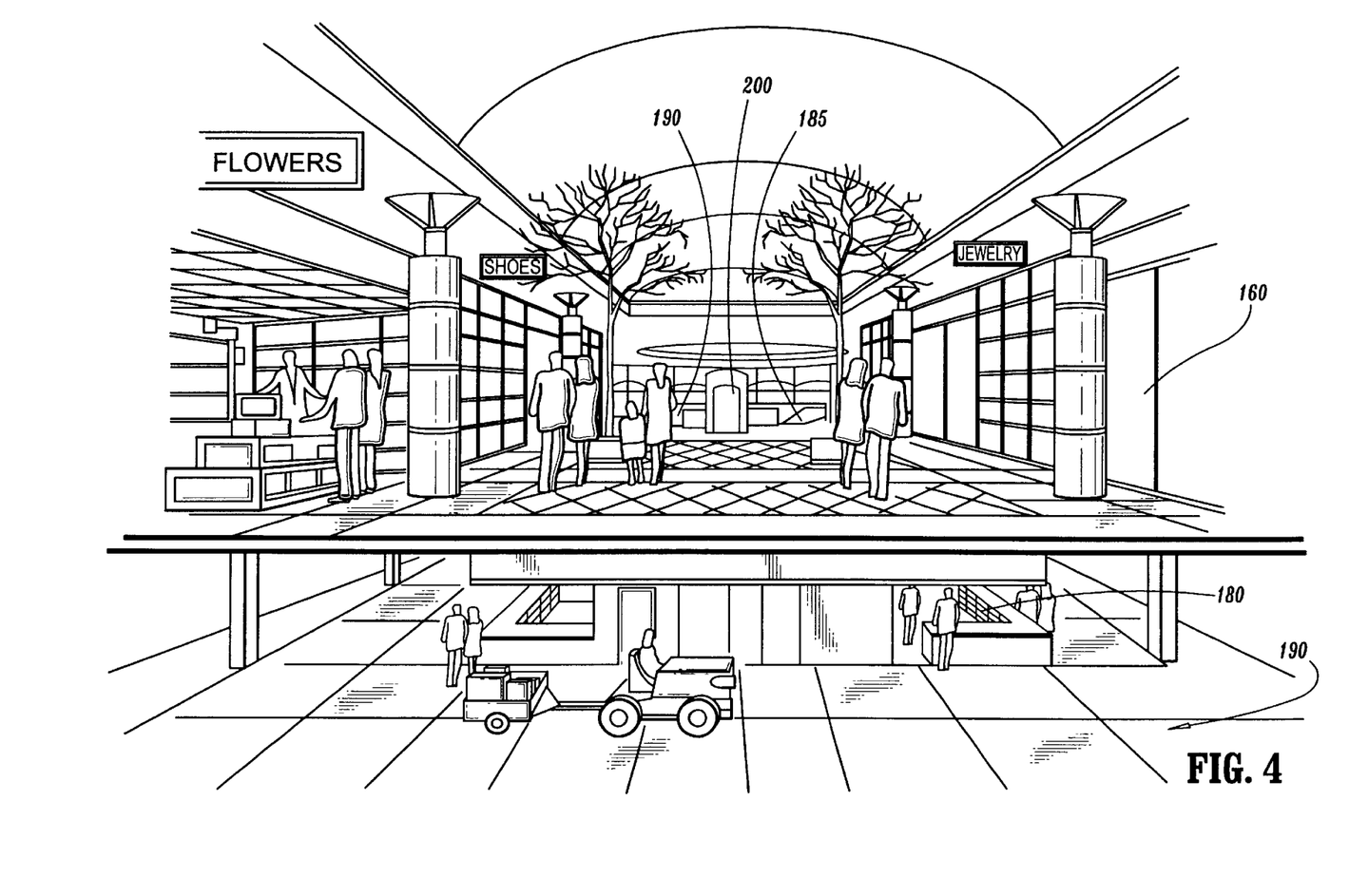
FIG. 4 illustrates a cross-sectional perspective view of a terminal/hangar facility according to one embodiment of the present invention.
Figure 5:
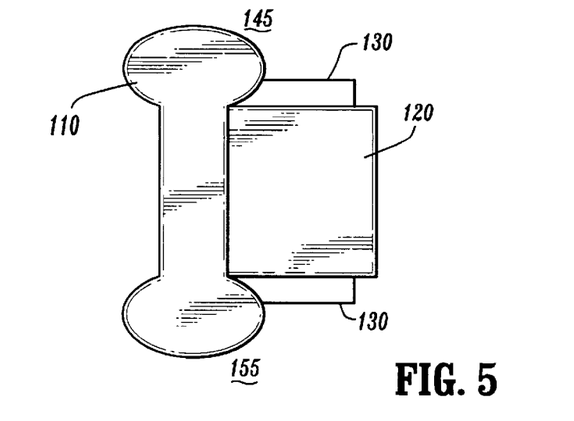
FIG. 5 illustrates a top view of an aircraft terminal/hangar facility according to another embodiment of the present invention.
Figure 6:
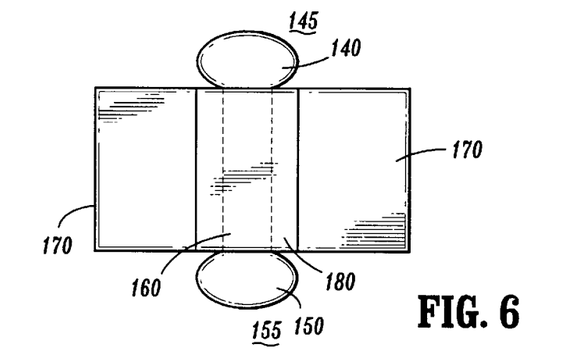
FIG. 6 illustrates a top view according to an additional embodiment of the present invention.

In an embodiment, the separation is vertical The vertical separation is provided by having the passageway 160 located above the hangar support area 180. However, in other embodiments, see FIGS. 5 and 6 the passageway 160 can be provided to one side of, or below, the hangar and maintenance area 120. Movement between the hangars 170 is provided by one or more passages 190 which also provide access to the hanger support area 180.

Figure 7:
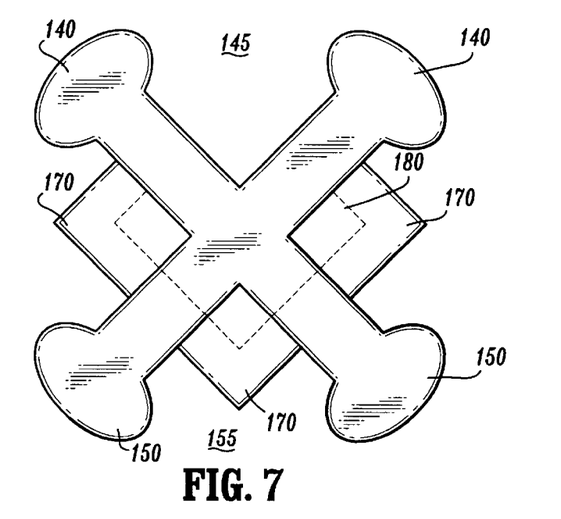
FIG. 7 illustrates a top view according to a further embodiment of the present invention.

In the embodiment of FIGS. 1–4, the passenger area 110 roughly defines a straight path or axis 200 along which the passengers move from the street side 145 to the runway side 155. Similarly, the hangar and maintenance area 120 also roughly defines a straight hangar/maintenance path or axis 210 between the hangars 170 via the passages 190. The doors or portals 220 for aircraft access to each hangar 170 are positioned at the far end of the hangars with respect to the path 200. In this embodiment, the passenger path 200 is transverse or crosses the hangar/maintenance path 210, although on different levels. This transverse positioning allows the passageway 160 to be located between the hangars 170, while providing access for aircraft to the hangars 170 from separate aprons 230, 240 on the sides of the building 100. Accordingly, the central portion of the building 100 is vertically shared, that is, on the first level the central portion is part of the hangar and maintenance area 120 and on the second level the central portion is part of the passenger area 110. As illustrated in FIG. 7, multiple hangar and maintenance areas 120 and/or passenger areas 110, and the corresponding paths, can similarly share a common center portion in accordance with the invention.

In one embodiment, access to the passageway 160 is provided by stairs 185, ramps, escalators 190 and/or elevators 200 which allow for movement between the passenger entry area 140 at one end and the passenger boarding area 150 at the other end. In another embodiment, the entrances to the passenger entry area 140 are provided above the level of the hangar and maintenance area 120, but below the level of the passageway 160. Because of the smaller change in level required by such entrances, relatively short ramps having a gentle slope can be used to connect the passenger entry area 140 to the passageway 160.

The office areas 130, in the embodiment, are located along portions of the hangars 170 on the street side 145 and/or the runway side 155 of the airport building 100. While the office areas 130 can be used for almost any purpose, in one embodiment, the office areas include office space for: tenant/hangar services 250; pilot services 260; airline services 270; tenants 280; additional maintenance areas 290; and loading docks 300. In one embodiment, the loading docks 300 can be shared by the various users of the airport building 100 for freight handling, cargo, shipping, receiving, and other services. Accordingly, the loading docks 300 provide a single point of access to the building 100 for delivery vehicles from the street side 145 for subsequent distribution to the office space 130, the hangar and maintenance area 120, aircraft, and/or the passenger area 110.

While this invention includes buildings in which the passenger path 200 and the hangar/maintenance path 210 are located transverse and orthogonal with respect to each other, in one embodiment, the hangar and maintenance area 120 is transverse, but oriented to be askew with respect to the passenger area 110, as seen from above. This jogged or askew alignment allows the passageway 160 to be shorter than the length 310 of the hangars 170. This shorter length is both a convenience to passengers and allows for a reduction in the amount of materials required for the building.

Figure 8:
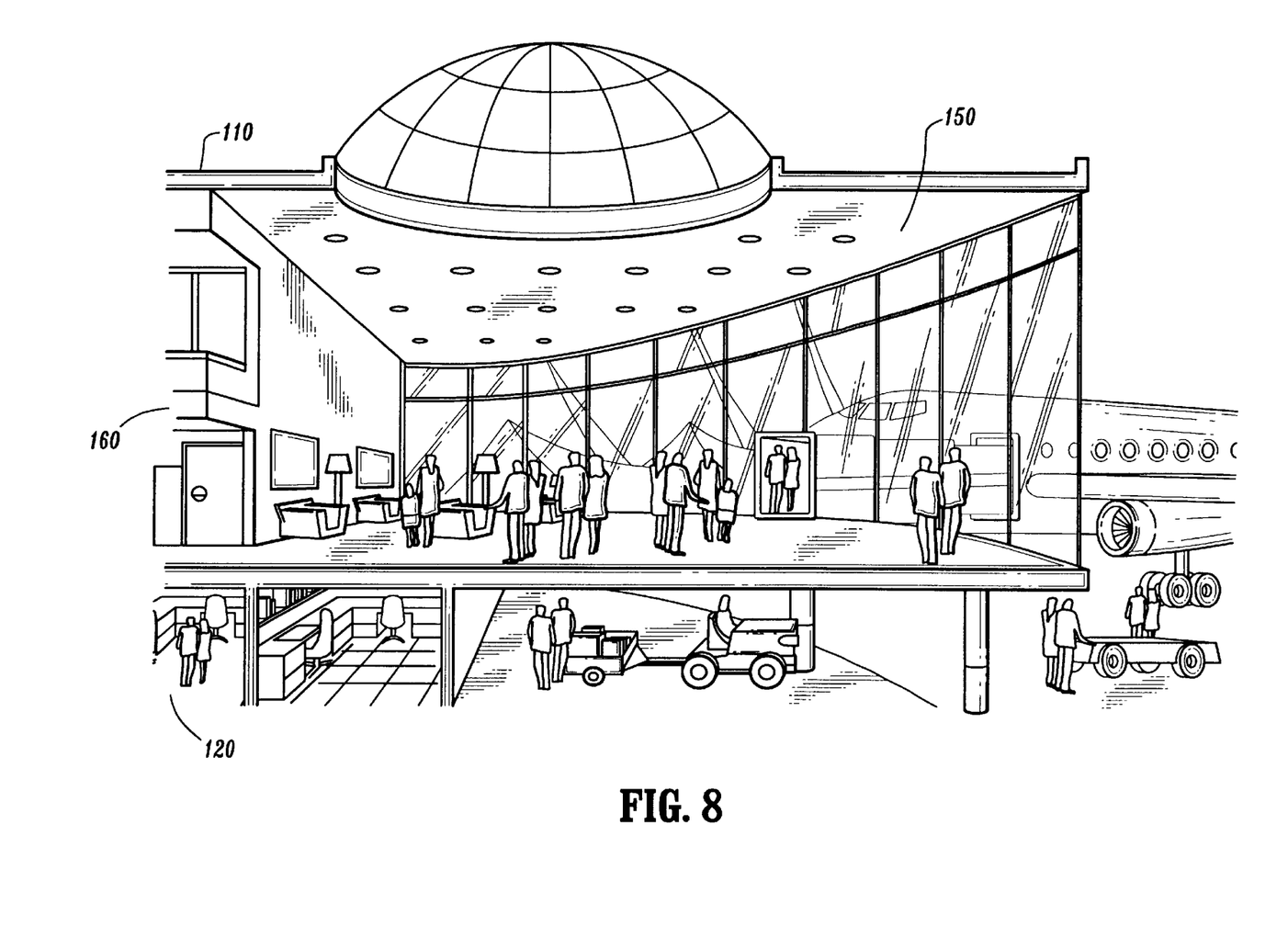
FIG. 8 illustrates a cutaway perspective view of a terminal/hanger facility according to an embodiment of the present invention having a jetway.

In operation, passengers arrive from the street side 145 of the hangar/terminal building 100. The passengers enter the passenger entry area 110. In one embodiment, ticketing and baggage check-in may be provided in the passenger entry area 140 as well as other passenger services and amenities such as commercial shops, restrooms, skylights, planters, restaurants, etctera. The passengers then proceed up a first group 320 of stairs, ramps, escalators, and/or elevators to the passageway 160. The passageway 160, in one embodiment, can include passenger services and amenities. The passengers traverse the passageway 160 to a second group 330 of stairs, ramps, escalators, and/or elevators which the passengers take down to the passenger boarding area 150. However, in one embodiment, at least a portion of the passenger boarding area 150 is on, or near, the same level as the passageway 160 to accommodate moveable walkways or jetways that attach directly to aircraft, see FIG. 8. The passenger boarding area 150, in one embodiment, includes a lounge, seating, ticketing facilities, baggage check-in, baggage claim, and/or other passenger services and amenities. The aircraft, for boarding, can pull up to the passenger boarding area 150, to a walkway next to the passenger boarding area, or if available, connect to the moveable walkways or jetways. Passengers disembarking aircraft travel in the reverse direction from the passenger boarding area 150, through the passageway 160, to the passenger entry area 140 and out to the street side 145 of the hangar/terminal facility 100. People going to or from the office areas 130 can use the passenger area 110 or separate entrances/exits 340 provided for the office areas. Some office areas, in one embodiment, are provided with direct access 350 to the maintenance and hangar area 120. Such access can be restricted to only authorized personnel.

For maintenance, aircraft move from the runways and taxiways to the apron 230, 240 outside of one of the hangars 170. From the particular apron 230, 240, the aircraft can move through the hangar doors 220 into the respective hangar 170. Maintenance personnel can then access the aircraft using equipment and materials located in the each of the hangars 170 at the hanger support service area 180. In the embodiment shown in FIGS. 1–4, by having two hangars 170 with separate doors the amount of rearranging of aircraft for servicing is reduced when compared with a single larger hangar with only one door.

Figure 9:
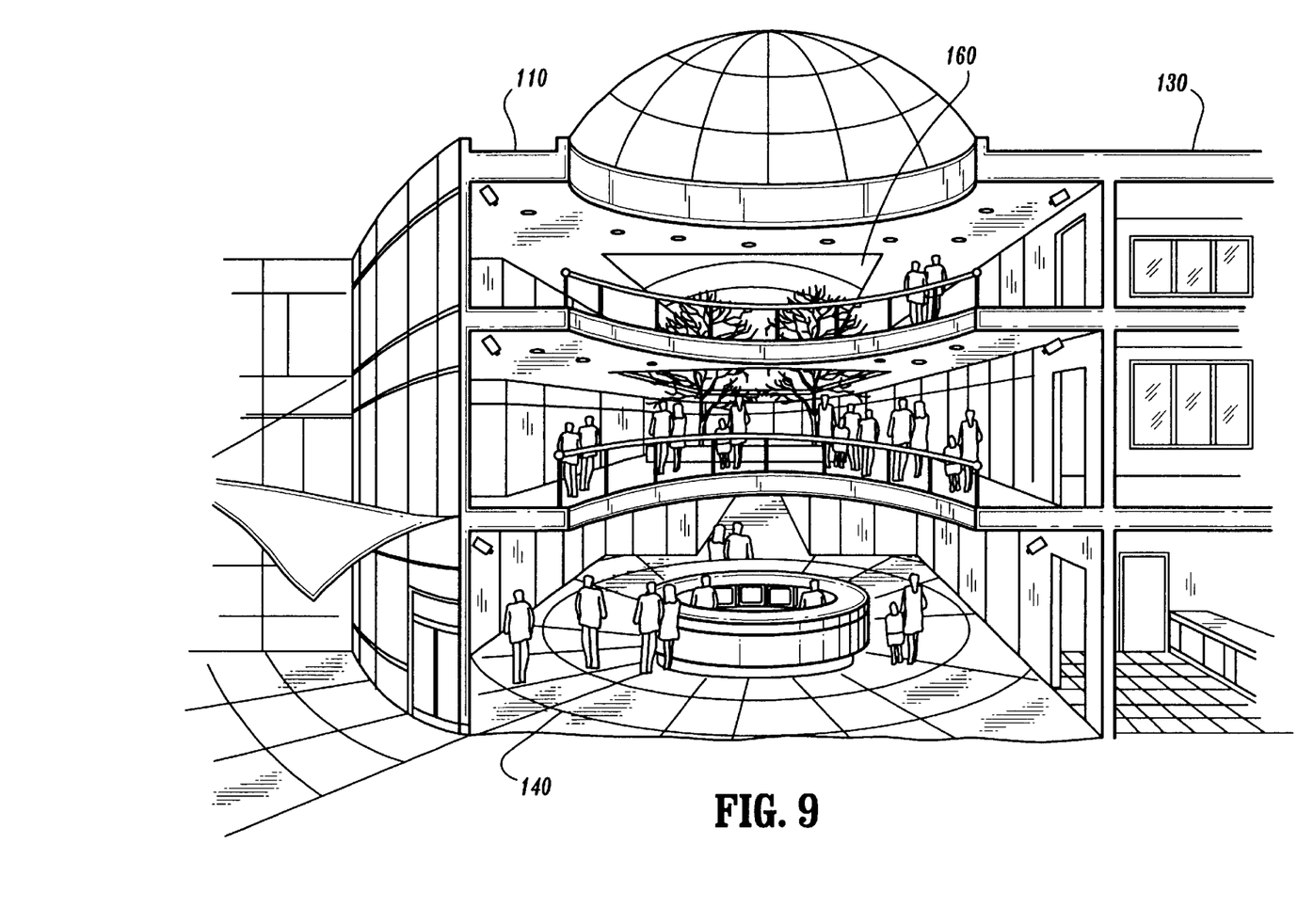
FIG. 9 illustrates a cutaway perspective view of a terminal/hanger facility according to an embodiment of the present invention in which the passenger area and the office area have multiple levels.

As shown in FIG. 9, in one embodiment of the invention, the airport building 100 can provide a passenger area 110 and/or an office area 130 having in whole, or in part, multiple levels.

The hangar and maintenance area 120 can also include multiple levels.

Thus, it is apparent that in accordance with the present invention, an apparatus and method that fully satisfies the objectives, aims, and advantages of the invention is set forth above. While this invention has been described with respect to a specific embodiments and examples, the specific embodiments and examples are illustrative only and should not be construed as limiting the broad scope of the invention. Accordingly, it is intended that the present invention embraces all alternatives, modifications, and variations as fall within the scope of the appended claims.

What is claimed:

1. An airport building comprising:
   a passenger area comprising a passageway, the passageway defining a first horizontal axis; and
   an aircraft maintenance and storage area for maintaining and storing aircraft adjoining the passenger area, the aircraft maintenance and storage area comprising at least one hangar, the hangar having a portal on a far end of the hangar with respect to the first axis, and defining a second horizontal axis, such that the first axis is transverse to the second axis.

2. An airport building of claim 1 wherein:
   the aircraft maintenance and storage area further comprises another hangar, one hangar being offset from the other hangar along the first axis.

3. The airport building of claim 1 wherein the passenger area comprises:
   a passenger entry area located on a first level;
   a passenger boarding area; and
   a passageway located on a second level connecting the passenger entry area to the passenger boarding area and bypassing a hangar support area.

4. The airport building of claim 1 wherein the aircraft maintenance and storage area further comprises:
   a hangar support area.

5. The airport building of claim 3 wherein the passageway is vertically separated from the aircraft maintenance and storage area.

6. The airport building of claim 1 further comprising:
   an office area extending along one or more portions of a street side of the airport building, the office area further comprising a portal for allowing entry into the office area directly from the street side of the airport building.

7. The airport building of claim 1 further comprising:
   an office area extending along one or more portions of a runway side of the airport building, the office area further comprising a portal for allowing entry into the office area directly from the runway side of the airport building.

8. The airport building of claim 3 wherein the passageway comprises:
   passenger services and amenities.

9. The airport building of claim 1 wherein:
   the passenger area extends from a street side of the building to a runway side of the building; and
   the aircraft maintenance and storage area has at least one portal adjacent to an apron, the apron having access to taxiways.

10. An airport building comprising:
    at least two hangars, each hanger having a portal on one side of the hangar, each portal providing access to aircraft from a respective apron outside the airport building into the respective hangar;
    a hangar support area located between the respective hangars, the hangar support area providing servicing equipment for servicing aircraft in each of the respective hangars;
    a first pedestrian area located adjacent each respective hangar on a first side of the hangar support area, the first pedestrian area having a pedestrian portal for providing access for pedestrians to the first pedestrian area from outside the airport building;
    a passageway connected at a first end to the first pedestrian area; the passageway providing a bypass of the hangar support area for pedestrians;
    a second pedestrian area located adjacent each respective hangar on a second side of the hangar support area; the second pedestrian area connected to a second end of the passageway and adjacent a first apron on one side of the airport building; and
    such that each hangar has a respective apron located adjacent to the first apron.

11. The airport building of claim 10 wherein the hangars, the hangar support area, and the first pedestrian area are located on ground level.

12. The airport building of claim 1 wherein the first axis is orthogonal to the second axis.

13. The airport building of claim 1 wherein the first axis is askew with respect to the second axis.

* * * * *